(12) United States Patent
Nishikawa

(10) Patent No.: US 10,583,726 B2
(45) Date of Patent: Mar. 10, 2020

(54) GLASS RUN FOR AUTOMOBILE DOOR

(71) Applicant: Nishikawa Rubber Co., Ltd., Nishi-ku, Hiroshima-shi, Hiroshima (JP)

(72) Inventor: Shinji Nishikawa, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 67 days.

(21) Appl. No.: 15/925,571

(22) Filed: Mar. 19, 2018

(65) Prior Publication Data

US 2018/0290526 A1 Oct. 11, 2018

(30) Foreign Application Priority Data

Apr. 11, 2017 (JP) .................................. 2017-078259

(51) Int. Cl.
| | | |
|---|---|---|
| *B60J 10/265* | (2016.01) | |
| *B60J 10/18* | (2016.01) | |
| *B60J 10/88* | (2016.01) | |
| *B60J 10/76* | (2016.01) | |
| *B60R 13/06* | (2006.01) | |

(52) U.S. Cl.
CPC ............. *B60J 10/265* (2016.02); *B60J 10/18* (2016.02); *B60J 10/76* (2016.02); *B60J 10/88* (2016.02); *B60R 13/06* (2013.01)

(58) Field of Classification Search
CPC ............. B60J 10/18; B60J 10/76; B60J 10/88
See application file for complete search history.

(56) References Cited

U.S. PATENT DOCUMENTS

| | | | | |
|---|---|---|---|---|
| 8,302,350 | B2* | 11/2012 | Lee ........................... | B60J 10/87 49/440 |
| 8,840,170 | B2* | 9/2014 | Zimmer .................. | B60R 13/02 296/146.9 |
| 9,027,284 | B2* | 5/2015 | Murree ................. | E06B 7/2314 49/495.1 |
| 9,073,422 | B2* | 7/2015 | Bartolomucci .......... | B60J 10/18 |
| 9,091,114 | B2* | 7/2015 | Franzen .................. | F16B 5/121 |
| 9,718,338 | B2* | 8/2017 | Nam ........................ | B60J 10/88 |
| 9,802,555 | B2* | 10/2017 | Thiel ....................... | B60R 13/04 |
| 2004/0043188 | A1* | 3/2004 | Tsujiguchi ............... | B60J 10/18 428/122 |
| 2013/0174492 | A1* | 7/2013 | Laycoe ............... | B29C 48/0022 49/475.1 |
| 2015/0266364 | A1* | 9/2015 | Im ........................... | B60J 10/76 49/495.1 |
| 2016/0059684 | A1* | 3/2016 | Nam ....................... | B60J 10/088 49/483.1 |

(Continued)

FOREIGN PATENT DOCUMENTS

CN 104924999 9/2015

*Primary Examiner* — Catherine A Kelly
(74) *Attorney, Agent, or Firm* — Potomac Law Group, PLLC; Kenneth Fagin

(57) ABSTRACT

Disclosed is a technique of narrowing a trim strip and improving ease of assembly. A boundary portion between upper and outer plate portions in the cross-section of a core is curved to have a large curvature. An outer portion of a glass run body is provided with an upper elastic protrusion engaging with an upper engagement portion of the trim strip. A gap is formed between an upper part of the outer portion of the glass run body and an upper portion of the trim strip. The gap allows the trim strip to move excessively toward the inside of a cabin.

7 Claims, 5 Drawing Sheets

(56) References Cited

U.S. PATENT DOCUMENTS

| | | | |
|---|---|---|---|
| 2017/0001504 A1* | 1/2017 | Takeda | B60J 10/27 |
| 2017/0355254 A1* | 12/2017 | Lee | B60J 10/265 |
| 2018/0009149 A1* | 1/2018 | Iwamoto | B21D 53/88 |
| 2018/0162208 A1* | 6/2018 | Jo | B60J 10/18 |
| 2018/0186225 A1* | 7/2018 | Charge | B60J 10/88 |
| 2019/0193542 A1* | 6/2019 | Prodoni | B60J 10/265 |

* cited by examiner

INSIDE OF CABIN ←          → OUTSIDE OF CABIN

INSIDE OF CABIN ←          → OUTSIDE OF CABIN

INSIDE OF CABIN ⟵          ⟶ OUTSIDE OF CABIN

INSIDE OF CABIN ←            → OUTSIDE OF CABIN

GLASS RUN FOR AUTOMOBILE DOOR

CROSS-REFERENCE TO RELATED APPLICATION

This application claims priority to Japanese Patent Application No. 2017-078259 filed on Apr. 11, 2017, the entire disclosure of which is incorporated by reference herein.

BACKGROUND

The present disclosure relates to a glass run disposed in an automobile door. In particular, the present disclosure relates to a configuration of a glass run assembled to a window frame from the outside of a cabin.

In general, there are various types of automobile side doors, one of which has a window frame (also called a sash) holding a peripheral portion of a window glass. A door having such a window frame is provided with a glass run for sealing a gap between the window frame and the window glass.

Chinese Patent Application Publication No. 104924999 discloses a glass run assembled to a window frame from the outside of a cabin. Such a glass run is called a "hiding type" glass run partially covering the window frame from the outside of the cabin. This glass run may sometimes be adopted due to, e.g., design requirements of a vehicle.

In the glass run of this hiding type, the window frame is provided with a glass run mount which protrudes toward the outside of the cabin and to which a glass run body is assembled. The glass run body includes a core comprised of a rigid material, and an insertion groove, with the core buried in the glass run body, and the glass run mount of the window frame inserted into the insertion groove. The glass run disclosed in Chinese Patent Application Publication No. 104924999 is assembled to the window frame from the outside of a cabin through insertion of the glass run mount of the window frame into the insertion groove. In this assembled state, stiffness of the core can provide a power for retaining the glass run.

Chinese Patent Application Publication No. 104924999 also discloses a trim strip made of, e.g., metal, and attached to the glass run body outside the cabin. Upper and lower portions of the trim strip are respectively hooked on, i.e., engage with, upper and lower elastic protrusions formed in the outer surface of the glass run body facing the outside of the cabin.

SUMMARY

In the glass run of the hiding type, a trim strip may be required to be made slender by having a narrower width in some cases due to design requirements. However, as disclosed in Chinese Patent Application Publication No. 104924999, the trim strip is assembled with the upper and lower portions of the trim strip hooked on the elastic protrusions of the glass run body. Therefore, during assembly of the trim strip, the trim strip needs to press and elastically deform the elastic protrusions to be hooked on the elastic protrusions. That is to say, during assembly of the trim strip, the trim strip is once excessively moved across an assembly completion position further toward the inside of the cabin, and after being hooked, the trim strip moves back to the assembly completion position due to resilience of the elastic protrusions. Therefore, a gap for the excessive moving has to be provided between the glass run body and the trim strip. However, if the width of the trim strip is narrowed, the gap for the excessive moving is seen from the outside, which is unsuitable in terms of appearance.

Therefore, it is conceivable to narrow the width of the glass run body. If the width of the glass run body is narrowed, it is possible to narrow the width of the trim strip associated with that of the glass run body. However, the glass run body needs to be provided with an insertion groove for inserting the glass run mount of the window frame thereinto. The inner surface of the insertion groove and the glass run mount need to be spaced apart from each other to provide space for a sealing lip comprised of an elastic material for achieving sealing performance. Therefore, it is difficult to narrow the width of the glass run body.

An upper frame portion of the window frame is curved along, e.g., the roof shape of an automobile. However, it is actually difficult to mold the glass run body (including the core) to be consist with the curved shape of the upper frame portion. After the glass run body and the core are linearly integrally molded with each other, they are assembled to the window frame while being curved along the curved shape of the upper frame portion. At that time, in Chinese Patent Application Publication No. 104924999, the core includes parallelly arranged upper and lower plate portions, and a vertical plate portion extending from the outer end, farther from the cabin, of the upper plate portion (hereinafter referred to as "outer end of the upper plate portion") to the outer end, farther from the cabin, of the lower plate portion (hereinafter referred to as "outer end of the lower plate portion"). The upper plate portion is substantially perpendicular to the vertical plate portion, and the lower plate portion is substantially perpendicular to the vertical plate portion, and thus, the core has two corners of about 90 degrees. The core has such a cross-sectional shape, and thus, a large force is necessary to curve the glass run body, making the assembly difficult.

The present disclosure is conceived in view of the above problems, and attempts to narrow the width of a trim strip, and to improve ease of assembly.

In order to achieve the above attempts, a first aspect of the present disclosure relates to a glass run for an automobile door, the glass run being able to be assembled to a window frame which extends to define an opening of the automobile door, and to seal a gap between the window frame and the window glass, wherein the glass run includes: a glass run body made of an elastic material, and provided with an insertion groove into which a glass run mount is inserted, the glass run mount being formed in an upper frame portion of the window frame and extending toward an outside of a cabin; a core made of a harder material than the elastic material, and buried in the glass run body; and a trim strip assembled to an outer portion of the glass run body, upper and lower portions of the trim strip are respectively provided with upper and lower engagement portions, an inner surface of the insertion groove of the glass run body is provided with a sealing lip in contact with the glass run mount, the outer portion of the glass run body is provided with upper and lower elastic protrusions respectively engaging with the upper and lower engagement portions of the trim strip, the core includes an upper plate portion extending along an upper surface of the glass run mount, a lower plate portion extending along a lower surface of the glass run mount, and an outer plate portion extending from an outer end of the upper plate portion to an outer end of the lower plate portion, a boundary portion between the upper plate portion and the outer plate portion in a cross-section of the core having a larger curvature than a boundary portion between the lower plate portion and the outer plate portion does, and the outer portion of the glass run body is formed along the core.

According to this configuration, the boundary portion between the upper plate portion and the outer plate portion in the cross-section of the core has a larger curvature. Thus, the core can be curved and deformed with a smaller force than a core having two corners with substantially right angles as shown in the conventional example. Therefore, when the glass run body is assembled to the upper frame portion of the window frame, it is easily curved along the upper frame portion. When the glass run mount of the window frame is inserted into the insertion groove of the glass run body, the sealing lip formed in the inner surface of the insertion groove makes contact with the glass run mount.

When the trim strip is assembled to the glass run body, the upper engagement portion of the trim strip presses the upper elastic protrusion of the glass run body to elastically deform the upper elastic protrusion. At that time, the trip strip is excessively moved toward the inside of the cabin. Therefore, the gap for the excessive moving needs to be provided between the glass run body and the trim strip. In this aspect of the present disclosure, the boundary portion between the upper and outer plate portions in the cross-section of the core has a larger curvature, and the outer portion of the glass run body is formed along the core. This makes it possible to provide the gap for the excessive moving between the glass run body and the trim strip.

A second aspect of the present disclosure relates to a glass run for an automobile door, the glass run being able to be assembled to a window frame which extends to define an opening of the automobile door, and to seal a gap between the window frame and the window glass, wherein the glass run includes: a glass run body made of an elastic material, and provided with an insertion groove into which a glass run mount is inserted, the glass run mount being formed in an upper frame portion of the window frame and extending toward an outside of a cabin; a core made of a harder material than the elastic material, and buried in the glass run body; and a trim strip assembled to an outer portion of the glass run body, upper and lower portions of the trim strip are respectively provided with upper and lower engagement portions, an inner surface of the insertion groove of the glass run body is provided with a sealing lip in contact with the glass run mount, the outer portion of the glass run body is provided with upper and lower elastic protrusions respectively engaging with the upper and lower engagement portions of the trim strip, the core includes an upper plate portion extending along an upper surface of the glass run mount, a lower plate portion extending along a lower surface of the glass run mount, and an outer plate portion extending from an outer end of the upper plate portion to an outer end of the lower plate portion, a boundary portion between the upper plate portion and the outer plate portion in a cross-section of the core being bent at least twice to have a chamfer-like shape, and the outer portion of the glass run body is formed along the core.

According to this configuration, the boundary portion between the upper plate portion and the outer plate portion in the cross-section of the core has a chamfer-like shape. Thus, the core can be curved and deformed with a smaller force than a core having two corners with substantially right angles as shown in the conventional example. Therefore, when the glass run body is assembled to the upper frame portion of the window frame, it is easily curved along the upper frame portion. When the glass run mount of the window frame is inserted into the insertion groove of the glass run body, the sealing lip formed in the inner surface of the insertion groove makes contact with the glass run mount.

When the trim strip is assembled to the glass run body, the upper engagement portion of the trim strip presses the upper elastic protrusion of the glass run body to elastically deform the upper elastic protrusion. At that time, the trip strip is excessively moved toward the inside of the cabin. Therefore, the gap for the excessive moving needs to be provided between the glass run body and the trim strip. In this aspect of the present disclosure, the boundary portion between the upper and outer plate portions in the cross-section of the core has a chamfer-like shape, and the outer portion of the glass run body is formed along the core. This makes it possible to provide the gap for the excessive moving between the glass run body and the trim strip.

A third aspect of the present disclosure is an embodiment of the first aspect. In the third aspect, a lower part of the outer plate portion of the core is substantially perpendicular to the lower plate portion, and the sealing lip protrudes downward from an upper portion of the inner surface of the insertion groove.

According to this configuration, if the glass run mount of the window frame is inserted into the insertion groove of the glass run body, the sealing lip makes contact with the upper surface of the glass run mount, and the glass run mount is disposed inside the insertion groove. At that time, the lower part of the outer plate portion of the core is substantially perpendicular to the lower plate. Thus, the lower part of the outer plate portion of the core can position the outer end of the glass run mount.

A fourth aspect of the present disclosure is an embodiment of the first aspect. In the fourth aspect, a gap is formed between an upper part of the outer portion of the glass run body and the upper engagement portion of the trim strip, the gap allowing the trim strip to excessively move toward an inside of the cabin when the trim strip is assembled to the glass run body, and the gap is disposed closer to the cabin than an outer end surface of the outer portion of the glass run body is.

According to this configuration, the gap for excessively moving the trim strip toward the inside of the cabin is disposed closer to the cabin than the outer end surface of the outer portion of the glass run body is. This can provide the gap for the excessive moving without causing deterioration of appearance.

A fifth aspect of the present disclosure is an embodiment of the first aspect. In the fifth aspect, a second plate portion is stacked on a first plate portion to form the glass run mount, and an outer end of the second plate portion is disposed closer to the cabin than an outer end of the first plate portion is.

According to this configuration, the second plate portion is stacked on the first plate portion to form the glass run mount. At that time, the outer end of the above-disposed second plate portion is disposed closer to the cabin than the outer end of the below-disposed first plate portion is. This can form the end of the glass run mount associated with the cross-sectional shape of the core.

A sixth aspect of the present disclosure is an embodiment of the first aspect. In the sixth aspect, a tip end of the upper elastic protrusion of the glass run body is disposed closer to the cabin than an outer end surface of the outer portion of the glass run body is, and the upper engagement portion of the trim strip engages with the upper elastic protrusion of the glass run body in a position closer to the cabin than the outer end surface of the outer portion of the glass run body is.

According to this configuration, the upper engagement portion of the trim strip engages with the upper elastic protrusion in a position closer to the cabin than the outer end surface of the glass run body is. This can provide the gap for the excessive moving without causing deterioration of appearance during assembly.

According to the first aspect, the boundary portion between the upper plate portion and the outer plate portion in the cross-section of the core has a larger curvature. Thus, only a small force is needed to curve and deform the glass run body, thereby improving ease of assembly. In addition, even if the vertical width of the trim strip is narrowed, the gap for the excessively moving during assembly of the trim strip to the glass run body can be provided between the glass run body and the trim strip without causing deterioration of appearance. Further, the sealing lip in the inner surface of the insertion groove makes contact with the glass run mount of the window frame inserted into the insertion groove of the glass run mount. This can provide sealing performance.

According to the second aspect, the boundary portion between the upper plate portion and the outer plate portion in the cross-section of the core being has a chamfer-like shape. Thus, only a small force is necessary to curve the glass run body, thereby improving ease of assembly. In addition, even if the width of the trim strip is narrowed, the gap for the excessively moving during assembly of the trim strip to the glass run body can be provided between the glass run body and the trim strip without causing deterioration of appearance. Further, the sealing lip in the inner surface of the insertion groove makes contact with the glass run mount of the window frame inserted into the insertion groove of the glass run mount. This can provide sealing performance.

According to the third aspect, with the glass run mount of the window frame inserted into the insertion groove of the glass run body, the glass run mount can be disposed inside the insertion groove. At that time, the lower part of the outer plate portion of the core is substantially perpendicular to the lower plate portion. Thus, the lower part of the outer plate portion of the core can accurately position the outer end of the glass run mount.

According to the fourth aspect, the gap for excessively moving the trim strip toward the inside of the cabin is disposed between an upper part of the outer portion of the glass run body and the upper engagement portion of the trim strip. This gap is disposed closer to the cabin than the outer end surface of the outer portion of the glass run body is. This can provide this gap without causing deterioration of appearance.

According to the fifth aspect, the second plate portion is stacked on the first plate portion to form the glass run mount. At that time, the outer end of the second plate portion is disposed closer to the cabin than the outer end of the first plate portion is. This can form the end of the glass run mount associated with the cross-sectional shape of the core.

According to the sixth aspect, the upper engagement portion of the trim strip engages with the upper elastic protrusion in a position closer to the cabin than the outer end surface of the outer portion of the glass run body is. This can provide the gap for the excessive moving without causing deterioration of appearance during assembly.

DETAILED DESCRIPTION

Embodiments of the present disclosure will now be described in detail with reference to the drawings. The following description of advantageous embodiments is only an example in nature, and is not intended to limit the scope, applications, or use of the present disclosure.

First Embodiment

Figure 1:
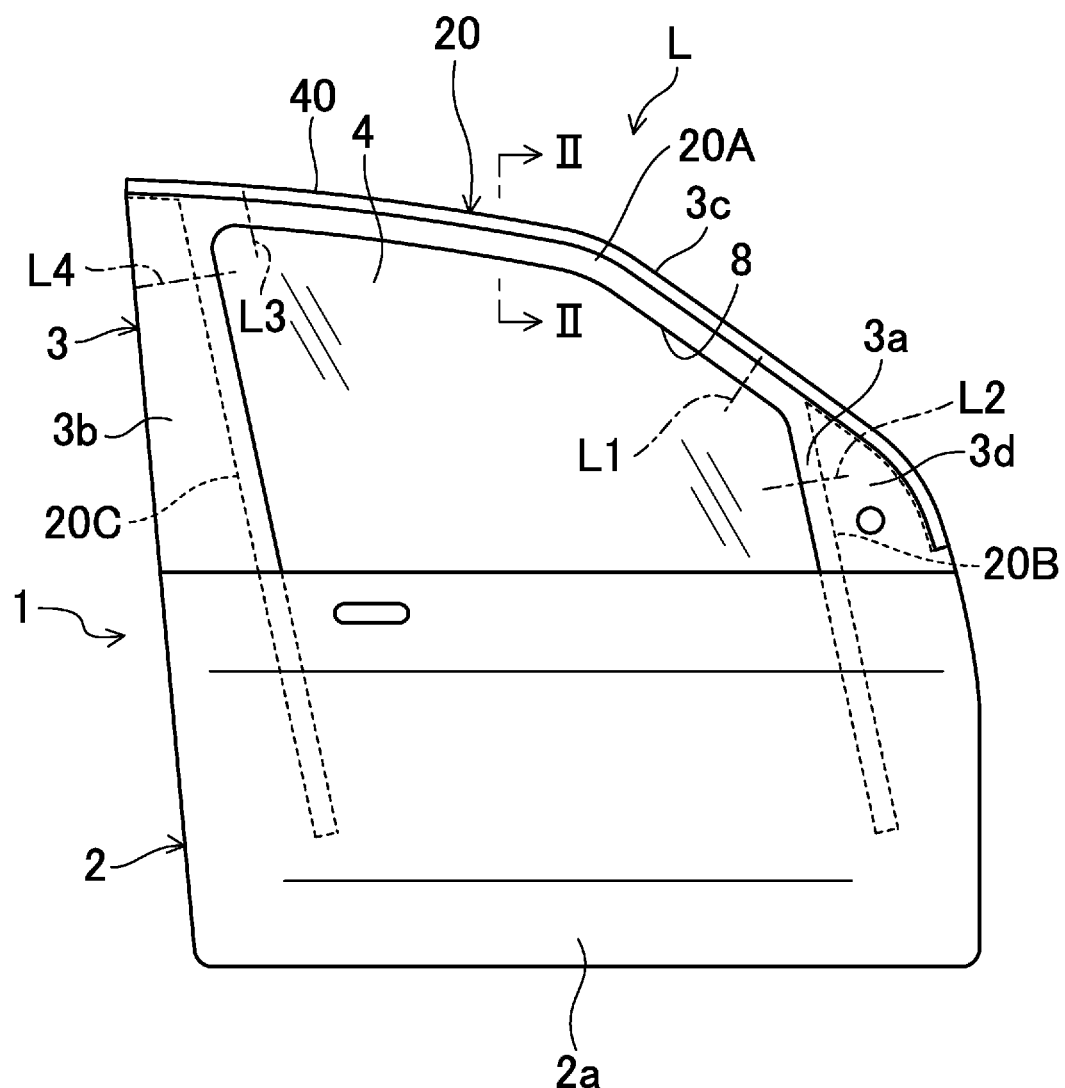
FIG. 1 is a view of an automobile door including an automobile door glass run according to a first embodiment as observed from the outside of a cabin.

FIG. 1 is a view of an automobile door 1 including a glass run 20 for the automobile door 1 according to a first embodiment of the present disclosure, from the outside of a cabin. This automobile door 1 is a front door arranged near the front of an automobile (not shown) on each side of the automobile, and covers or uncovers an opening (not shown) formed through each side of the automobile near the front of the automobile. Although not shown, if a rear door is arranged on each side of the automobile, the present disclosure is also applicable to a glass run attached to the rear door.

In the description of this embodiment, the side closer to the front of the vehicle is simply referred to as "front," and the side closer to the rear of the vehicle is simply referred to as "rear."

The automobile door 1 includes a door body 2 comprising almost lower half of the automobile body 1, and a window frame 3 comprising almost upper half of the automobile body 1. Although not shown, a front end of the door body 2 is attached to a pillar of an automobile body via hinges pivoting about an axis extending in a vertical direction. The door body 2 includes an inner panel (not shown) and an outer panel 2a which are made of a steel sheet or any other suitable material, and is configured to house a window glass 4 which is movable up and down, and a lifting apparatus (not shown) which allows the window glass 4 to move up and down.

Figure 2:
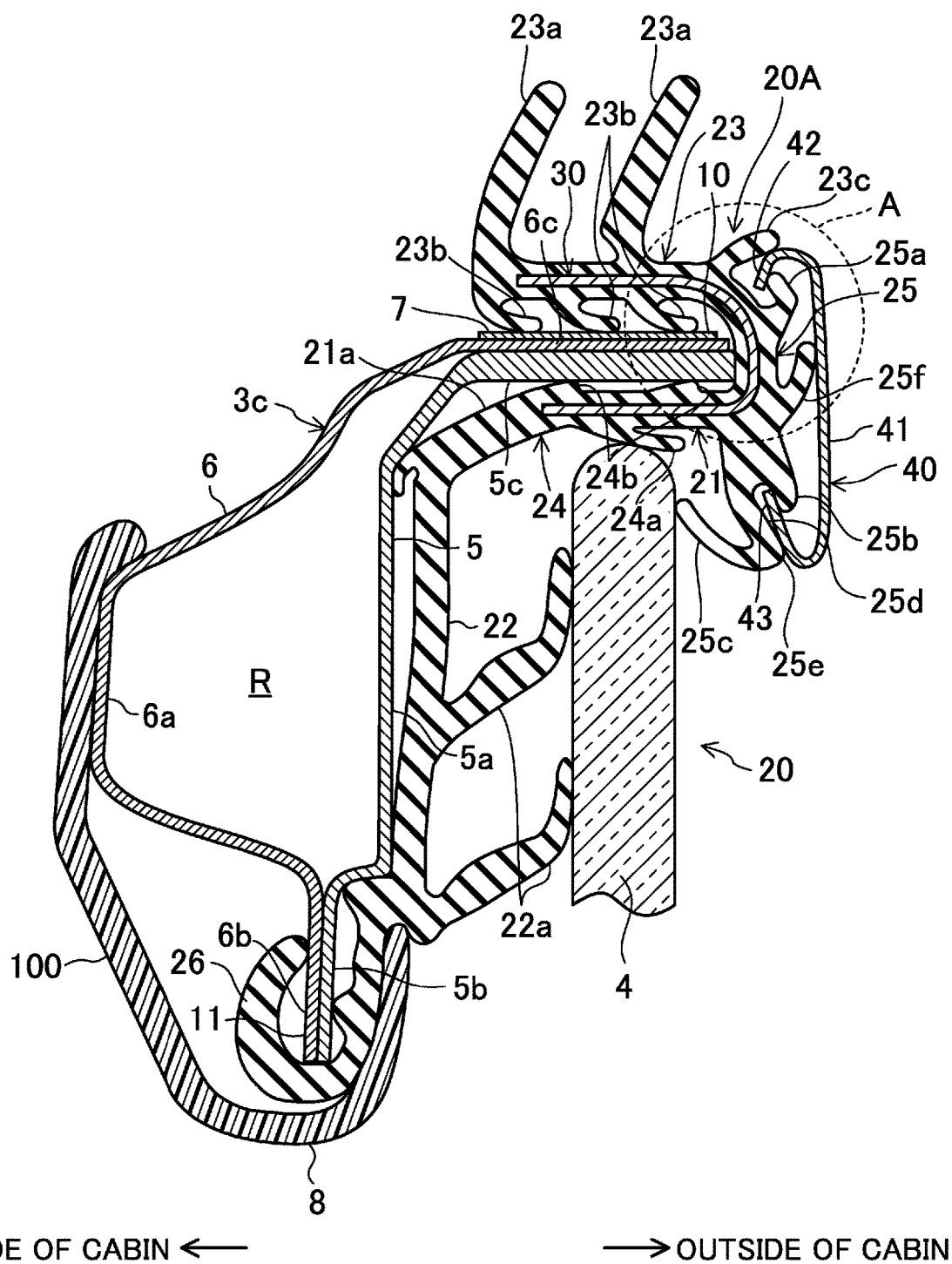
FIG. 2 is a cross-sectional view taken along line II-II of FIG. 1.

The window frame 3 functions as a sash holding a peripheral portion of the window glass 4, and extends to define a window opening 8. The window glass 4 is configured to cover or uncover the window opening 8 defined by the window frame 3. The window frame 3 of this embodiment is comprised of a combination of first, second, and third plate portions 5, 6, and 7, which are press-formed from a steel sheet or any other suitable material, as shown in FIG. 2. Note that the window frame 3 may be obtained by, for example, roll forming.

As illustrated in FIG. 1, the window frame 3 is comprised of a front frame portion 3a, a rear frame portion 3b, and an upper frame portion 3c. The front frame portion 3a protrudes upward from a front portion of an upper edge of the door body 2. The rear frame portion 3b extends upward from a rear portion of the upper edge of the door body 2. The rear frame portion 3b extends to be taller than the front frame portion 3a. The upper frame portion 3c extends in a front-rear direction of the vehicle from an upper end of the front frame portion 3a to an upper end of the rear frame portion 3b along a side edge of a roof (not shown) of the automobile body. The shape of the upper frame portion 3c is not limited to the illustrated one. Alternatively, the upper frame portion 3c may be entirely curved upward, or may have a curved portion suitably positioned, or an inclination angle suitably determined, in association with the roof shape of the automobile body.

A door mirror mount 3d to which a door mirror (not shown) is attached is provided forward of the front frame portion 3a of the window frame 3. The door mirror mount 3d has an upper edge portion continuous with the front end portion of the upper frame portion 3c of the window frame 3.

As shown in FIG. 2, the window frame 3 includes a plate glass run mount 10 protruding toward the outside of the cabin, and an inner peripheral flange 11 protruding toward the inside (toward the center) of the window opening 8 (shown in FIG. 1). The inner peripheral flange 11, which protrudes toward the inside of the window opening 8, protrudes downward in the upper frame portion 3c. The inner peripheral flange 11 may be configured in the same manner in each of the front and rear frame portions 3a and 3b. In that case, an inner peripheral flange (not shown) in the front frame portion 3a extends rearward, and an inner peripheral flange (not shown) in the rear frame portion 3b extends forward. The front frame portion 3a and the rear frame portion 3b may be configured differently from the upper frame portion 3c.

The first and second plate portions 5 and 6 forming the window frame 3 are configured to define a hollow portion R inside the window frame 3. Specifically, the first plate portion 5 has, at a vertical middle portion thereof, an outer bulge 5a which bulges toward the outside of the cabin. The second plate portion 6 has, at a vertical middle portion thereof, an inner bulge 6a which bulges into the cabin.

The first plate portion 5 has an inner plate portion 5b closer to the window opening 8, and extending toward the inside of the window opening 8. The second plate portion 6 has an inner plate portion 6b closer to the window opening 8 and extending toward the inside of the window opening 8. The first plate portion 5 has an outer plate portion 5c farther from the window opening 8 and extending toward the outside of the cabin. The second plate portion 6 has an outer plate portion 6c farther from the window opening 8 and extending toward the outside of the cabin.

The inner planer portion 5b of the first plate portion 5 and the inner planer portion 6b of the second plate portion 6 are stacked and bonded together in the widthwise direction of the cabin, and the outer planer portion 5c of the first plate portion 5 and the outer planer portion 6c of the second plate portion 6 are stacked and bonded together in the vertical direction, thereby forming the hollow portion R. The outer planer portion 6c of the second plate portion 6 is stacked on the outer planer portion 5c of the first plate portion 5, and the third plate portion 7 is stacked on the outer planer portion 6c of the second plate portion 6, thereby forming the glass run mount 10.

Figure 3:
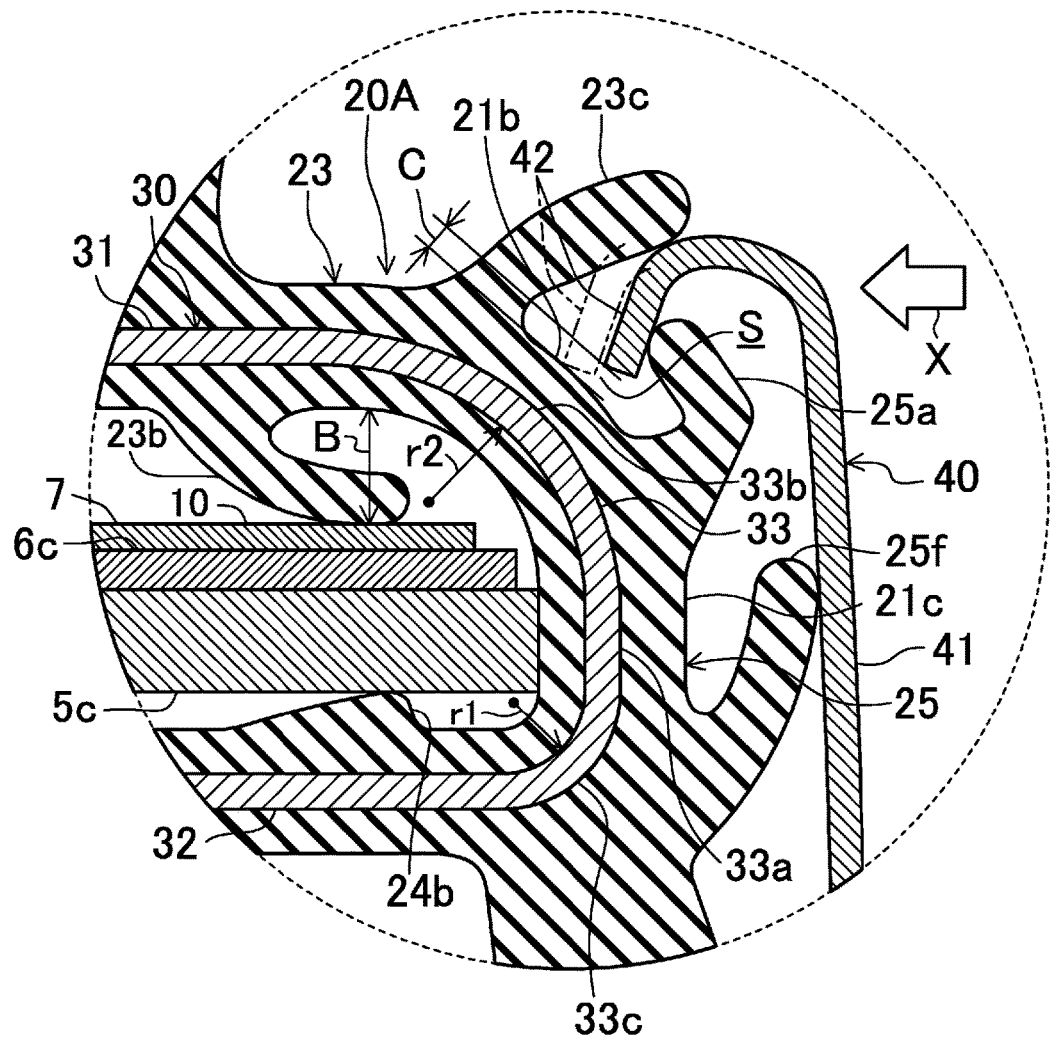
FIG. 3 is an enlargement of A in FIG. 2.

As shown at an enlarged scale in FIG. 3, an outer end, farther from the cabin, of the inner planer portion 6c of the second plate portion 6 (hereinafter referred to as "the outer end of the inner planer portion 6c of the second plate portion 6") is disposed closer to the inside of the cabin than an outer end, farther from the cabin, of the outer planer portion 5c of the first plate portion 5 (hereinafter referred to as "the outer end of the outer planer portion 5c of the first plate portion 5") is. Further, an outer end of the third plate portion 7 farther from the cabin is disposed closer to the cabin than the outer end of the inner planer portion 6c of the second plate portion 6 is. Therefore, the glass run mount 10 is formed such that the higher the outer end of the glass run mount 10 goes, the further inside of the cabin the outer end of the glass run mount 10 is located. In FIGS. 2 and 3, the outer planer portion 5c of the first plate portion 5 has a thickness larger than the other plate portions 6 and 7. However, this is a mere example, and the first to third plate portions 5 to 7 may respectively have an arbitrary thickness. The third plate portion 7 may be omitted, which is not shown.

(Configuration for Glass Run)

A glass run 20 is a so-called "hiding type" glass run which covers at least the outer portion of the window frame 3. The glass run 20 is assembled to the window frame 3 from the outside of the cabin, and functions as a seal which seals a gap between the window frame 3 and the window glass 4. The glass run 20 also covers the glass run mount 10, which is an outer surface of the window frame 3, and the inner peripheral flange 11 as well.

As shown in FIG. 2, the glass run 20 includes: a glass run body 21 assembled to the glass run mount 10 of the window frame 3; an inner side wall 22 integrally molded with the glass run body 21; a core 30; and a trim strip 40 assembled to an outer portion of the glass run body 21 farther from the cabin (hereinafter referred to as "the outer portion of the glass run body 21"). The core 30 and the glass run body 21 are made of different materials. Specifically, the core 30 may be made of a harder material than the material of the glass run body 21. Non-limiting examples of the material of the core 30 include a rigid resin (e.g., a resin containing talc or glass fibers), an aluminum alloy, a steel material, stainless steel, or any other suitable material. Non-limiting examples of the material for the glass run body 21 include ethylene-propylene rubber (EPDM) and thermoplastic elastomer olefin (TPO), which are elastic and softer than the core 30. The inner side wall 22 can be made of, e.g., EPDM or TPO. Such EPDM or TPO may be in a foamed state, or in a solid state.

The glass run 20 is comprised of a combination of an extrusion-molded portion and a die-molded portion which is molded in a molding die. As shown in FIG. 1, a portion around the boundary between an upper glass run (upper portion) 20A and a front glass run (front longitudinal portion) 20B of the glass run 20, i.e., a portion between boundary lines L1 and L2 (indicated by dash-and-dot lines), is a die-molded portion. Further, a portion around the boundary between the upper glass run 20A and a rear glass run (rear longitudinal portion) 20C of the glass run 20, i.e., a portion between boundary lines L3 and L4 (indicated by dash-and-dot lines) is a die-molded portion. Other portions of the glass run 20 are extrusion-molded.

As shown in FIG. 2, the glass run body 21 is provided with an insertion groove 21a which opens toward the inside of the cabin and into which the glass run mount 10 of the window frame 3 is inserted. This insertion groove 21a has a great depth in a direction in which the glass run mount 10 extends.

The glass run body 21 includes: an upper wall portion 23 extending in the front-rear direction along the upper surface of the glass run mount 10 of the window frame 3; a lower wall portion 24 extending in the front-rear direction along the lower surface of the glass run mount 10 of the window frame 3; and an outer wall portion 25 extending vertically from the outer end, farther from the cabin, of the upper wall portion 23 to the outer end, farther from the cabin, of the lower wall portion 24. The outer wall portion 25 is an outer portion of the glass run body 21 farther from the cabin. This outer portion of the glass run body 21 is covered with the trim strip 40 which will be described later. The insertion groove 21a opens in a gap between the inner end of the upper wall portion 23 closer to the cabin and the inner end of the lower wall portion 24 closer to the cabin.

The upper surface of the upper wall portion 23 of the glass run body 21 is provided with two upper sealing lips 23a and 23a extending upward. The upper sealing lips 23a and 23a make contact with an vehicle body panel (not shown) when the door 1 is closed. A portion of the upper surface of the upper wall portion 23, the portion being farther from the cabin than the upper sealing lips 23a is, is provided with an outer protrusion 23c extending outward in the front-rear direction. This outer protrusion 23c makes contact with the upper portion of the trim strip 40 from above.

The lower surface of the upper wall portion 23 of the glass run body 21 is the inner surface (upper surface) of the insertion groove 21a. The lower surface of the upper wall portion 23 is provided with lower sealing lips 23b, 23b, and 23b extending downward. The lower sealing lips 23b, 23b, and 23b correspond to sealing lips of the present disclosure, and are in contact with the upper surface of the glass run mount 10, i.e., the upper surface of the third planer portion 7.

The lower surface of the lower wall portion 24 of the glass run body 21 is provided with a lower protrusion 24a. The lower protrusion 24a makes contact with the upper edge of the window glass 4 that is in a closed state. The upper surface of the lower wall portion 24 is provided with a raised portion 24b. The raised portion 24b is formed to be smaller than the lower sealing lip 23b, and is in contact with the lower surface of the glass run mount 10, i.e., the lower surface of the outer planer portion 5c of the first plate portion 5. The raised portion 24b is smaller than the lower sealing lip 23b, and thus, the glass run mount 10 is disposed below a vertical middle position in the insertion groove 21a. That is to say, as shown in FIG. 3, the upper surface of the glass run mount 10 is spaced apart from the lower surface of the upper wall portion 23 of the glass run body 21 by a predetermined dimension B or more.

As shown in FIG. 2, the inner side wall 22 is continuous with the portion of the lower wall portion 24. The inner side wall 22 extends downward to the inner peripheral flange 11 of the window frame 3, and forms an inner decorative lip 26 bent upward to engage with the inner peripheral flange 11. The reference character 100 in FIG. 2 denotes a trim member.

The inner side wall 22 is provided with inner sealing lips 22a and 22a. The inner sealing lips 22a and 22a are in contact with the inner surface of the window glass 4 closer to the cabin.

An upper portion of the outer wall portion 25 of the glass run body 21 is provided with an upper elastic protrusion 25a. The upper elastic protrusion 25a extends toward the outside of the cabin, and is bent upward and toward the inside of the cabin, just like a hook. The tip end of this upper elastic protrusion 25a is adjacent to the tip end of the outer protrusion 23c.

A lower portion of the outer wall portion 25 of the glass run body 21 is provided with a lower elastic protrusion 25b extending downward. The lower elastic protrusion 25b extends such that the lower end thereof is disposed below the lower wall portion 24 and the lower protrusion 24a of the glass run body 21. A lower end of the lower elastic protrusion 25b is provided with an outer sealing lip 25c extending toward the inside of the cabin. The outer sealing lip 25c is in contact with the outer surface of the window glass 4 farther from the cabin.

A portion of the lower elastic protrusion 25b, farther from the cabin than the outer sealing lip 25c is, is provided with an engagement groove 25d engaging with a lower portion of the trim strip 40. This engagement groove 25d opens downward and extends in the front-rear direction. A portion of the lower elastic protrusion 25b, farther from the cabin than the engagement groove 25d is, is a lower protrusion 25e protruding farther downward than the engagement groove 25d is. This lower protrusion 25e is in contact with the lower portion of the trim strip 40 from the inside of the cabin.

The outer surface of the outer wall portion 25 of the glass run body 21 facing the outside of the cabin is provided with a pressing lip 25f protruding toward the outside of the cabin and upward. This pressing lip 25f is in contact with a substantial vertical middle portion of the inner surface of the trim strip 40 closer to the cabin.

As shown in FIG. 3, the core 30 includes upper, lower, and outer plate portions 31, 32, and 33. The upper plate portion 31 extends along the upper surface of the glass run mount 10 (the upper surface of the third plate portion 7). The lower plater portion 32 extends along the lower surface of the glass run mount 10 (the outer planer portion 5c of the first plate portion 5). The outer plate portion 33 extends from the outer end, farther from the cabin, of the upper plate portion 31 to the outer end, farther from the cabin, of the lower plate portion 32. The upper plate portion 31 of the core 30 is buried in the upper wall portion 23 of the glass run body 21. The lower plate portion 32 of the core 30 is buried in the lower wall portion 24 of the glass run body 21. The outer plate portion 33 of the core 30 is buried in the outer wall portion 25 of the glass run body 21. In other words, inner and outer sides of the glass run body 21 are formed along the core 30.

As shown in FIG. 3, a lower part 33a of the outer plate portion 33 of the core 30 is substantially perpendicular to the lower plate portion 32. The lower part 33a of the outer plate portion 33 is at least associated with the outer planer portion 5c of the first plate portion 5. The lower part 33a of the outer plate portion 33 is substantially perpendicular to the lower plate portion 32, thereby allowing the lower part 33a of the outer plate portion 33 to position the outer planer portion 5c of the first plate portion 5 at a predetermined position, with the glass run mount 10 inserted into the insertion groove 21a.

A boundary portion 33b between the upper plate portion 31 and the outer plate portion 33 in the cross-section of the core 30 is curved to have a larger curvature than a boundary portion 33c between the lower plate portion 32 and the outer plate portion 33 does. Thus, the boundary portion 33c between the lower plate portion 32 and the outer plate portion 33 is formed so as to draw an arc with a radius r1, whereas the boundary portion 33b between the upper plate portion 31 and the outer plate portion 33 is formed so as to draw an arc with a larger radius r2 than r1. This makes the upper corner in the cross-section of the core 30 gently curved, and thus, this also makes the outer corner, farther from the cabin, of the glass run body 21 formed along the core 30 gentle. As a result, the upper elastic protrusion 25a can be disposed above the vehicle.

The trim strip 40 is made of, e.g., a metal or a rigid resin material coated with metal, and extends along the upper frame portion 3c of the window frame 3 in the front-rear direction. The vertical middle portion of the trim strip 40 is a body 41 disposed so as to be exposed to the outside. In the trim strip 40, the upper portion above the body 41 is provided with an upper engagement portion 42 engaging with the upper elastic protrusion 25a of the glass run body 21. The upper engagement portion 42 is implemented as a portion extending from the upper end of the body 41 toward the inside of the cabin, and is bent to further extend downward. This upper engagement portion 42 is hooked on the upper elastic protrusion 25a of the glass run body 21 from above to engage with the upper elastic protrusion 25a. With the upper engagement portion 42 engaging with the upper elastic protrusion 25a, the outer protrusion 23c makes contact with the upper surface of the upper engagement portion 42.

Also, as shown in FIG. 2, in the trim strip 40, the lower portion below the body 41 is provided with a lower engagement portion 43 engaging with the lower elastic protrusion 25b of the glass run body 21. The lower engagement portion 43 is implemented as a portion extending from the lower end of the body 41 toward the inside of the cabin, and is bent to further extend upward. The lower engagement portion 43 is inserted from below into the engagement groove 25d formed in the lower elastic protrusion 25b of the glass run body 21 to engage with the lower elastic protrusion 25b.

The upper engagement portion 42 engages with the upper elastic protrusion 25a, and the lower engagement portion 43 engages with the lower elastic protrusion 25b, thereby assembling the trim strip 40 to the glass run body 21. When the trim strip 40 is assembled to the glass run body 21, as shown in FIG. 3, the pressing lip 25f is in contact with the back surface (the inner surface closer to the cabin) of the body 41 of the trim strip 40 to apply a force which outwardly presses the body 41. This makes it difficult to detach the upper engagement portion 42 from the upper elastic protrusion 25a, and the lower engagement portion 43 from the lower elastic protrusion 25b.

As shown in FIG. 3, with the trim strip 40 assembled to the glass run body 21, a gap S is formed between the tip end of the upper engagement portion 42 of the trim strip 40 (corresponding to the upper portion of the trim strip 40) and an upper part 21b of the outer portion of the glass run body 21. This gap S has a predetermined width C or more, and allows the trim strip 40 to move excessively toward the inside of the cabin (in the direction indicated by the hollow arrow X) when the trim strip 40 is assembled to the glass run body 21.

Specifically, when the upper engagement portion 42 of the trim strip 40 is about to engage with the upper elastic protrusion 25a, the upper engagement portion 42 is disposed outside the upper elastic protrusion 25a, and then, is moved and pressed along the arrow X toward the upper elastic protrusion 25a, thereby elastically deforming the upper elastic protrusion 25a. At that time, the trim strip 40 needs to be once excessively moved across an assembly completion position toward the inside of the cabin (indicated by the solid line in FIG. 3), only a part of which is indicated by the imaginary line in FIG. 3. The excessive moving can sufficiently deform the upper elastic protrusion 25a. As a result, the upper engagement portion 42 of the trim strip 40 is hooked on the upper elastic protrusion 25a, and after being hooked, the trim strip 40 moves back to the assembly completion position due to resilience of the elastic protrusions. The predetermined width C may be large enough to hook the upper engagement portion 42 of the trim strip 40 on the upper elastic protrusion 25a. The gap S is disposed closer to the cabin than an outer surface 21c, facing the outside of the cabin, of the outer portion of the glass run body 21 is (hereinafter referred to as "the outer surface 21c of the outer portion of the glass run body 21").

Also, in this embodiment, the tip end of the upper elastic protrusion 25a of the glass run body 21 is disposed closer to the cabin than the outer surface 21c of the outer portion of the glass run body 21 is. The upper engagement portion 42 of the trim strip 40 engages with the upper elastic protrusion 25a at a portion closer to the cabin than the outer surface 21c of the glass run body 21 is.

(Assembly of Glass Run)

Next, it will be described how to assemble the glass run 20 having the above configuration to the window frame 3 of the automobile door 1. First, the trim strip 40 is assembled to the glass run body 21. In the assembly of the trim strip 40, the lower engagement portion 43 of the trim strip 40 is first inserted from below into the engagement groove 25d formed in the lower elastic protrusion 25b of the glass run body 21. Thereafter, the upper engagement portion 42 of the trim strip 40 is moved as indicated by the arrow X in FIG. 3 to be pressed toward the upper elastic protrusion 25a, and is further excessively moved as shown in the imaginary line to be hooked on the upper elastic protrusion 25a. Then, the external force is released, thereby assembling the trim strip 40 to the glass run body 21, as shown in the solid line in FIG. 3.

Next, the glass run 20 is disposed outside of the window frame 3, and then, is moved, relative to the window frame 3, toward the inside of the cabin such that the glass run mount 10 of the window frame 3 is inserted into the insertion groove 21a of the glass run 20.

At that time, the upper frame portion 3c of the window frame 3 is curved along, e.g., the roof shape of the automobile as described above. However, it is actually difficult to form the glass run body 21 (including the core 30) to be consist with the curved shape of the upper frame portion 3c. After the glass run body 20 and the core 30 are linearly integrally molded with each other, they are assembled to the window frame 3 while being curved along the curved shape of the upper frame portion 3c.

In this embodiment, the boundary portion 33b between the upper plate portion 31 and the outer plate portion 33 in the cross-section of the core 30 has a larger curvature. Thus, the core can be curved and deformed with a smaller force than a core having two corners with substantially right angles as shown in the conventional example. Therefore, when the glass run body 21 is assembled to the upper frame portion 3c of the window frame 3, it is easily curved along the upper frame portion 3c.

When the glass run mount 10 is inserted into the insertion groove 21a of the glass run 20, the upper surface of the glass run mount 10 makes contact with the lower sealing lips 23b, 23b, and 23b to provide sealing between the glass run mount 10 and the glass run body 21. When the glass run mount 10 is inserted into the insertion groove 21a of the glass run 20 to be furthest in the depth direction, the outer planer portion 5c of the first plate portion 5 of the glass run mount 10 is positioned by the lower part 33a of the outer plate portion 33 since the lower part 33a of the outer plate portion 33 is substantially perpendicular to the lower plate portion 32 in the core 30. At that time, the outer end of the outer planer portion 6c of the second plate portion 6 and the outer end of the third plate portion 7 is not in contact with the outer wall portion 25 of the glass run 10. Therefore, they can accurately be positioned by the outer planer portion 5c of the first plate portion 5.

Here, in this embodiment, the trim strip 40, that has been assembled to the glass run body 21 in advance, is assembled to the window frame 3 of the automobile body 1. Alternatively, the glass run body 21 may be assembled to the window frame 3 of the automobile door 1 in advance, and then, the trim strip 40 may be assembled to the glass run body 21.

Advantages of Embodiment

As can be seen from the foregoing description, according to the glass run 20 for an automobile door in the first embodiment, the boundary portion 33b between the upper plate portion 31 and the outer plate portion 33 in the cross-section of the core 30 has a larger curvature. As a result, the glass run body 21 is easily curved along the upper frame portion 3c to improve ease of assembly.

The trim strip 40 is excessively moved toward the inside of the cabin, thereby being assembled to the glass run body 21, easily. In this embodiment, the boundary portion 33b between the upper plate portion 31 and the outer plate portion 33 in the cross-section of the core 30 has a larger curvature, and the outer portion of the glass run body 21 farther from the cabin is formed along the core 30. Thus, even if the width of the trim strip 40 in the vertical direction of the vehicle is narrowed, it is possible to provide the gap S for the excessively moving between the glass run body 21 and the trim strip 40 without deterioration of appearance.

Second Embodiment

Figure 4:
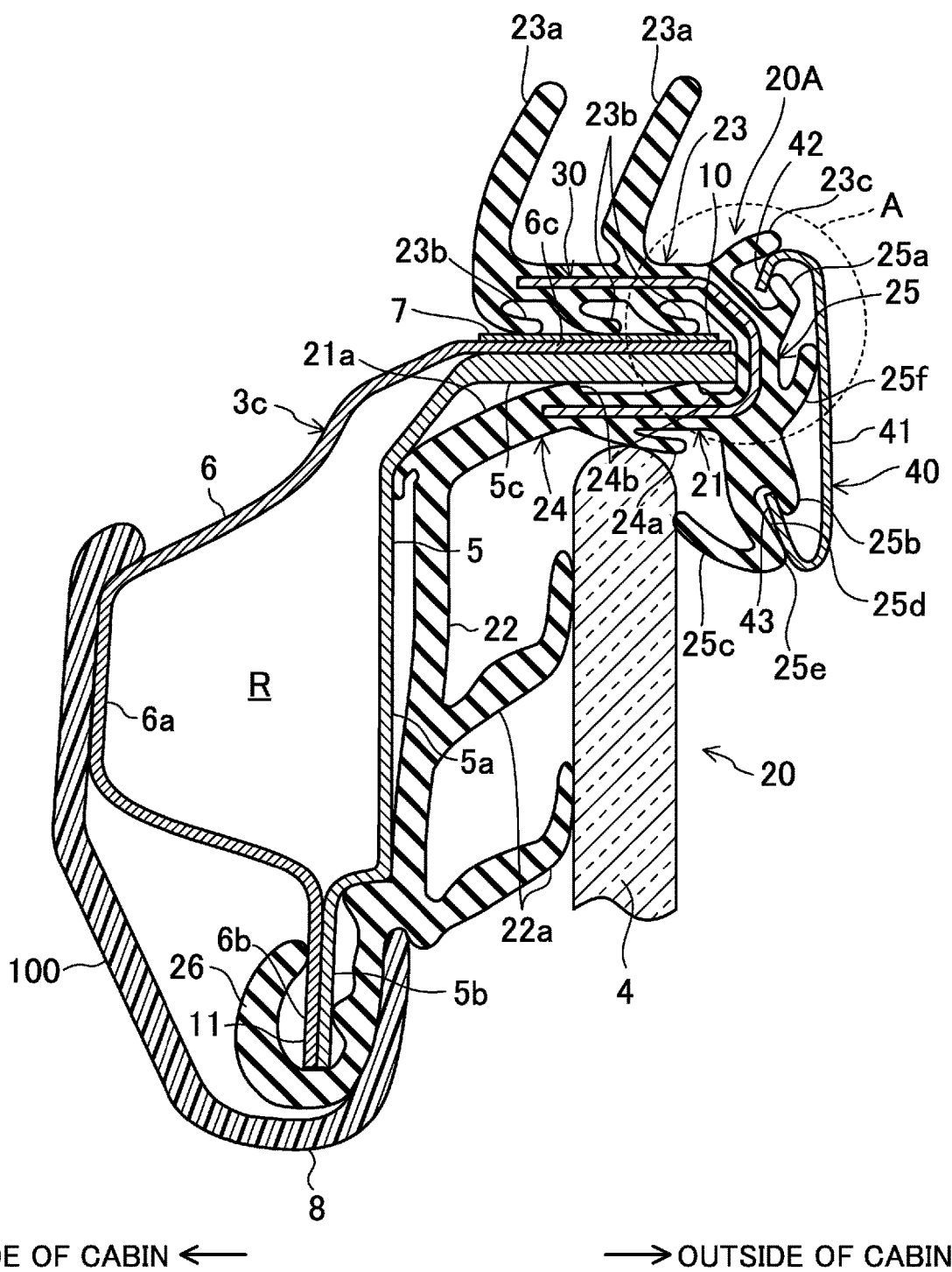
FIG. 4 is a view corresponding to FIG. 2, and illustrating a second embodiment.
Figure 5:
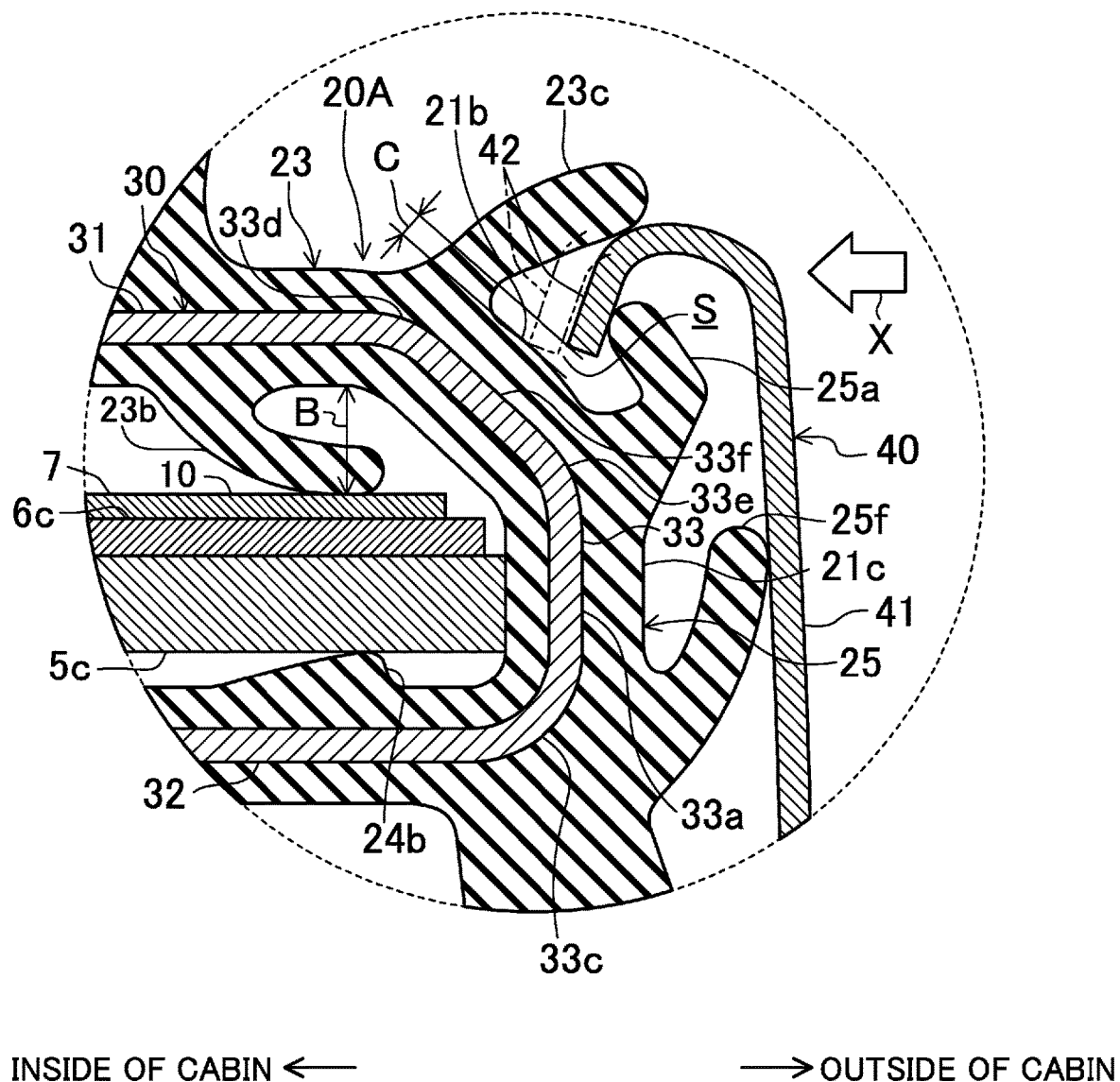
FIG. 5 is a view corresponding to FIG. 3, and illustrating the second embodiment.

FIGS. 4 and 5 relate to a second embodiment according to the present disclosure, and in the second embodiment, the cross-sectional shape of the core 30 and the cross-sectional shape of the glass run body 21 are different from those in the first embodiment, and other components are the same as those in the first embodiment. In the following description, the components that have been described in the first embodiment are designated by the same reference characters, and are not described in detail. The following description will focus on only differences from the first embodiment.

In the second embodiment, the boundary portion between the upper plate portion 31 and the outer plate portion 33 in the cross-section of the core 30 is bent at least twice to have a chamfer-like shape. Specifically, as shown in FIG. 5, the boundary between the upper plate portion 31 and the outer plate portion 33 in the cross-section of the core 30 includes a first bent portion 33d closer to the upper plate portion 31, and a second bent portion 33e closer to the outer plate portion 33. The first bent portion 33d is spaced apart from the second bent portion 33e. The first bent portion 33d is disposed above the second bent portion 33e.

A portion of the core 30 between the first bent portion 33d and the second bent portion 33e is a slanted portion 33f. The slanted portion 33f is slanted downward toward the outside of the cabin. Therefore, the boundary portion between the upper plate portion 31 and the outer plate portion 33 in the cross-section of the core 30 has a chamfer-like shape. Thus, the core can be curved and a with a smaller force than a core having two corners with substantially right angles as shown in the conventional example. This can improve ease of assembly.

The trim strip 40 is excessively moved toward the inside of the cabin as shown in the imaginary line in FIG. 5, thereby being assembled to the glass run body 21, easily. In this embodiment, the boundary portion between the upper plate portion 31 and the outer plate portion 33 in the cross-section of the core 30 has a larger curvature, and the outer portion of the glass run body 21 is formed along the core 30. Thus, even if the width of the trim strip 40 in the vertical direction of the vehicle is narrowed, it is possible to provide the gap S for the excessively moving between the glass run body 21 and the trim strip 40 without deterioration of appearance.

The embodiments described above are mere examples in every respect, and shall not be interpreted in a limited manner. Furthermore, any modification and change equivalent to the scope of claims fall within the scope of the present disclosure.

As can be seen from the foregoing description, a glass run for an automobile door according to the present disclosure can be usefully assembled to a window frame from the outside of a cabin.

What is claimed is:

1. A glass run for an automobile door with a window, the glass run 1) being configured to be mounted on a glass run mount that protrudes outwardly from an upper portion of a predetermined window frame which extends along a portion of an open space within the automobile door to define, in part, a window opening of the automobile door, the glass run mount extending outwardly in a direction from a cabin side of the door toward an exterior side of the door; and 2) being configured to seal a gap between the window frame and the window glass when the window glass is in a closed position within the window opening, wherein the glass run comprises:

a glass run body made of an elastic material and provided with an insertion groove into which the glass run mount is inserted when the glass run is mounted to the glass run mount;

a core made of a harder material than the elastic material of the glass run body and buried in the glass run body; and a trim strip that is mounted on an outer portion of the glass run body, with upper and lower portions of the trim strip being provided with upper and lower engagement portions, respectively, wherein the outer portion of the glass run body is provided with 1) upper and lower elastic protrusions that engage with the upper and lower engagement portions of the trim strip, respectively, when the trim strip is mounted on the outer portion of the glass run body; and 2) a pressing lip that protrudes outwardly from the outer portion of the glass run body, between the upper and lower elastic protrusions, in a direction that, when the glass run is mounted on the glass run mount, extends from the cabin side of the door toward the exterior side of the door, and the core includes an upper plate portion, buried in the glass run body, that extends along an upper surface of the glass run mount when the glass run is mounted on the glass run mount, a lower plate portion, buried in the glass run body, that extends along a lower surface of the glass run mount when the glass run is mounted on the glass run mount, and an outer plate portion, buried in the glass run body, extending from an outer end of the upper plate portion to an outer end of the lower plate portion, with a boundary portion between the upper plate portion and the outer plate portion in a cross-section of the core having a larger curvature than a boundary portion between the lower plate portion and the outer plate portion does, and the outer portion of the glass run body is formed along the core.

2. A glass run for an automobile door with a window, the glass run 1) being configured to be mounted on a glass run mount that protrudes outwardly from an upper portion of a predetermined window frame which extends along a portion of an open space within the automobile door to define, in part, a window opening of the automobile door, the glass run mount extending outwardly in a direction from a cabin side of the door toward an exterior side of the door; and 2) being configured to seal a gap between the window frame and the window glass when the window glass is in a closed position within the window opening, wherein the glass run comprises:

a glass run body made of an elastic material and provided with an insertion groove into which the glass run mount is inserted when the glass run is mounted to the glass run mount;

a core made of a harder material than the elastic material of the glass run body and buried in the glass run body; and a trim strip that is mounted on an outer portion of the glass run body, with upper and lower portions of the trim strip being provided with upper and lower engagement portions, respectively, wherein the outer portion of the glass run body is provided with 1) upper and lower elastic protrusions that engage with the upper and lower engagement portions of the trim strip, respectively, when the trim strip is mounted on the outer portion of the glass run body; and 2) a pressing lip that protrudes outwardly from the outer portion of the glass run body, between the upper and lower elastic protrusions, in a direction that, when the glass run is mounted on the glass run mount, extends from the cabin side of the door toward the exterior side of the door, and the core includes an upper plate portion, buried in the glass run body, that extends along an upper surface of the glass run mount when the glass run is mounted on the glass run mount, a lower plate portion, buried in the glass run body, that extends along a lower surface of the glass run mount when the glass run is mounted on the glass run mount, and an outer plate portion, buried in the glass run body, extending from an outer end of the upper plate portion to an outer end of the lower plate portion, with a boundary portion between the upper plate portion and the outer plate portion in a cross-section of the core being bent at least twice to have a chamfer-like shape, and the outer portion of the glass run body is formed along the core.

3. The glass run of claim 1, wherein
a lower part of the outer plate portion of the core is substantially perpendicular to the lower plate portion of the core.

4. The glass run of claim 1, wherein
a gap is formed between an upper part of the outer portion of the glass run body and the upper engagement portion of the trim strip when the trim strip is mounted on the outer portion of the glass run body, the gap allowing the trim strip to excessively move toward the cabin side of the door when the glass run is mounted to the glass run mount and the trim strip is being mounted on the glass run body, and the gap is disposed closer to the cabin than an outer end surface of the outer portion of the glass run body is.

5. The glass run of claim 1, wherein
a tip end of the upper elastic protrusion of the glass run body is disposed closer to the cabin side of the door, when the glass run is mounted on the glass run mount, than an outer end surface of the outer portion of the glass run body is, and the upper engagement portion of the trim strip engages with the upper elastic protrusion of the glass run body in a position closer to the cabin side of the door, when the glass run is mounted on the glass run mount, than the outer end surface of the outer portion of the glass run body is.

6. The glass run of claim 1, wherein the pressing lip contacts a cabin-facing surface of a portion of the trim strip between the upper and lower engagement portions thereof when the trim strip is mounted on the outer portion of the glass run body such that the pressing lip presses the trim strip away from the cabin side of the door.

7. The glass run of claim 1, wherein the pressing lip protrudes upward and away from the glass run body.

* * * * *